Patented Apr. 30, 1935

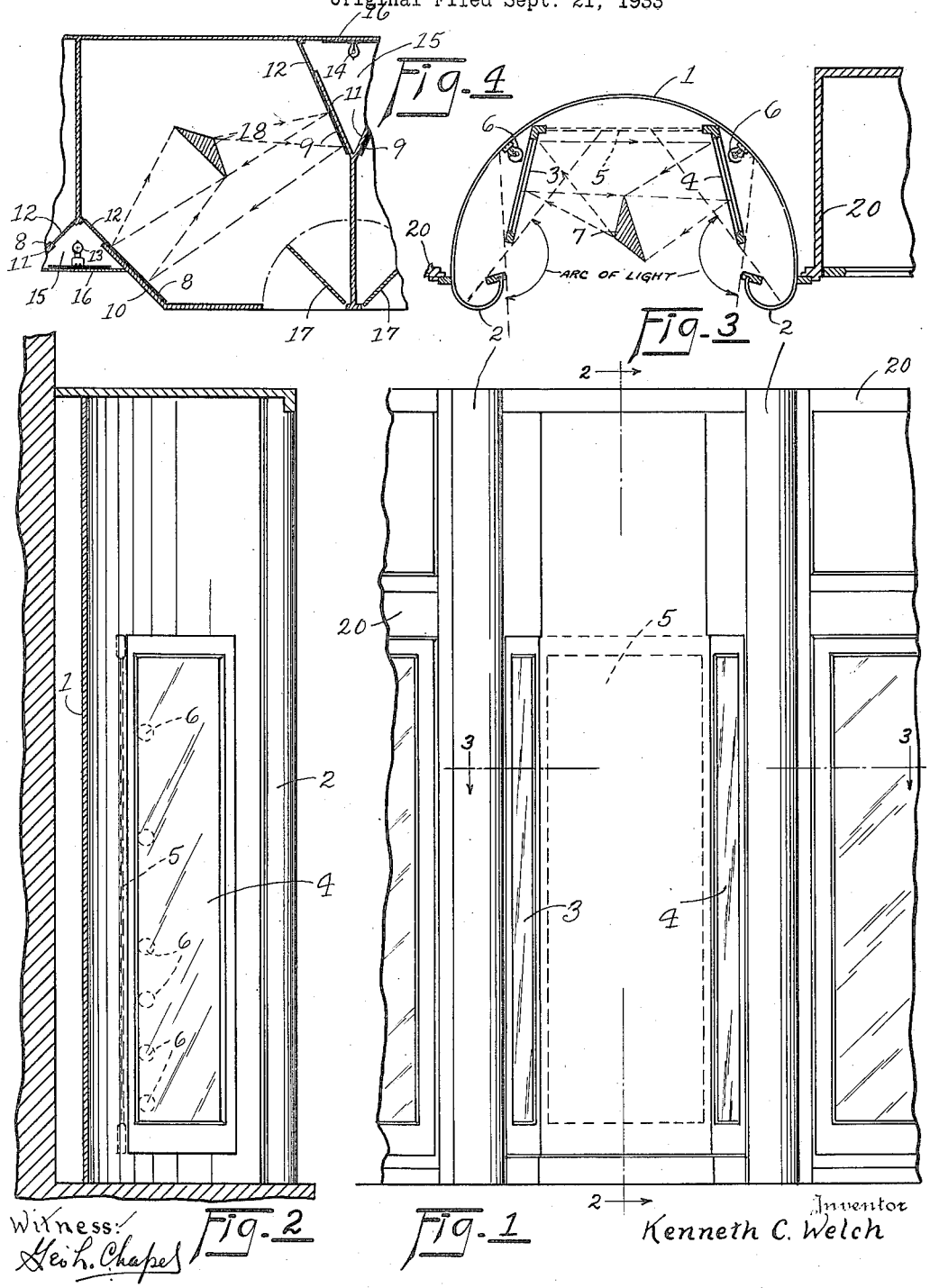

1,999,348

UNITED STATES PATENT OFFICE 1,999,348

ILLUMINATED MIRROR

Kenneth C. Welch, Grand Rapids, Mich., assignor to Grand Rapids Store Equipment Company, Grand Rapids, Mich., a corporation of Michigan Application September 21, 1933, Serial No. 690,379
Renewed October 1, 1934

10 Claims. (Cl. 240—4.1)

The present invention relates to illuminated mirrors and more particularly to angularly disposed illuminated mirrors especially adapted for use in retail stores showing wearing apparel offered for sale.

The principal objects of the invention are to provide a mirror structure of the character above indicated which is particularly adapted for use in ready-to-wear or millinery departments and sales spaces or dressing rooms of retail merchandising establishments; to provide such a construction comprising a pair of mirrors whose opposite marginal sides are illuminated and are so angularly disposed that a person facing one mirror obscures the illuminated marginal edge of the other mirror when viewing his back in the latter mirror; to provide such a mirror structure so constructed as to avoid glare in the eyes of the wearer of the apparel viewed by himself; to provide such a mirror structure in which the illumination may be graduated in intensity to most effectively display the apparel being viewed by the wearer; and, to provide such a mirror construction which is attractive in appearance and displays apparel in an advantageous, effective and sales-appealing manner.

Illustrative embodiments of the invention are shown in the accompanying drawing in which:

Figure 1 is a front elevational view of the mirror construction particularly adapted for use in a ready-to-wear or millinery department of a retail store and interposed between spaced display cabinets, wardrobes, or other display fixtures within the store;

Figure 2 is a sectional view thereof on line 2—2 of Figure 1;

Figure 3 is a sectional view on line 3—3 of Figure 1; and

Figure 4 is a top plan sectional view of a modified form of the invention as the same may be utilized in a sales space or dressing room used for trying on and fitting dresses, suits or other wearing apparel.

Referring to the drawing, and particularly to the structure illustrated in Figures 1, 2 and 3 thereof, in which like parts of the construction are designated by the same numerals in the several views, the structure therein shown, comprises a vertically disposed arcuate panel 1 interposed and secured between display cases, wardrobes or other merchandising fixtures 20 of the same height and best shown in Figure 3. The concave surface of the arcuate panel is preferably treated as by painting or spraying to provide a light diffusing and reflecting surface and its outer vertical marginal lengths 2 are turned inwardly.

A pair of spaced vertically positioned mirrors 3, 4 and angularly fixedly disposed with reference to each other are set up within the confines of the arcuate panel, the inner marginal lengths abutting the concave surface of the panel and their outer marginal lengths being spaced therefrom. A third mirror 5, indicated in dotted lines may be interposed and secured between the other two mirrors in instances where a triplicate mirror is desired.

Illuminating means concealed from view of the observer is here shown as comprising a plurality of incandescent light bulbs 6 disposed between the rear side of the mirrors 3, 4 and the concave light diffusing and reflecting surface of the panel. Light rays thus emanating from the light bulbs are diffused and reflected by the arcuate surface of the panel outwardly through the opening defined by the opposite outer vertical marginal lengths of the mirrors 3, 4 and the outer vertical marginal lengths 2 of the panel, on the person in the "arc of light" as indicated at 7 standing or sitting within the confines of the panel as indicated in Figure 3. The spacing of the lamp sockets and the type of bulbs used therein may be varied to give a graduated illumination as may be desired and as determined, depending upon the use to be made of any given mirrors. Thus in the mirror construction shown in Figures 1, 2 and 3 when used in trying on dresses, suits and the like and it is desired to properly illuminate the entire apparel of the wearer, the lamp sockets are preferably spaced so that the greatest light intensity is near the waist line of the individual viewing himself in the mirror, graduating in intensity upwardly toward the shoulders. In instances where the mirror structure is used in a millinery department of a retail store, the lamp sockets should be so arranged that the greatest intensity of the light is on the head and face of the person trying on the hat.

The construction shown in Figure 4 is particularly adapted for use in fitting rooms and illustrates how the invention may be utilized in a single or series of adjacent fitting rooms. Each room or series of adjacent rooms is provided with a pair of spaced vertically positioned mirrors 8, 9, angularly disposed with reference to each other and secured against the opposite walls 10, 11 of the fitting room in any suitable manner. Each of these mirrors is here shown as provided with an integral acid etched or otherwise translucent treated portion 12 adjacent their opposite vertical marginal lengths. Illuminating means such as the incandescent lamps 13, 14 disposed in properly spaced vertical alignment are disposed within the triangular recesses 15 which are provided with vertically disposed reflecting surfaces 16. Access to these fitting rooms may be had through the swinging doors 17. Light emanating from the lamps 13, 14 through the translucent portions 12 may be properly graduated in intensity and diffused to illuminate the apparel worn by the person 18 within the fitting room and in the manner heretofore suggested with respect to the mirror construction of Figures 1, 2 and 3.

Particular attention is here called to the fact that a person standing or sitting in the position indicated in Figures 3 and 4 and facing one mirror, obscures the illuminated surface or portion of the mirror when observing his back in the latter mirror. In viewing his back he is thus not distracted by the illuminated surface or portion of the rear mirror and where the illumination is properly graduated, directed and diffused, attention is properly directed to the apparel being tried on or fitted and without overhead glare with its consequent distraction.

It will thus be seen that the mirror constructions herein shown and described are so arranged that glare is avoided, illumination intensity may be directed, graduated and controlled and that apparel on the wearer may be advantageously, effectively and appealingly displayed.

While but several specific embodiments of this invention have been herein shown and described, it will be understood that numerous details of the constructions shown may be altered or omitted without departing from the spirit of this invention as defined by the appended claims.

I claim:

1. In a structure of the class described, a pair of mirrors fixedly spaced from and at an angle to each other, concealed illuminating means for each mirror, each reflecting its rays adjacent the outer marginal side of its mirror, said mirrors being disposed at such an angle to each other that a person may face one mirror and obscure distracting reflected rays adjacent the marginal side of the other mirror when viewing his back in the latter mirror.

2. In a structure of the class described, an arcuate panel having a light reflecting surface on its concave side, a pair of mirrors within the confines of said panel fixedly spaced from and at an angle to each other, concealed illuminating means for each mirror whose rays are reflected toward each other from opposite sides of the arcuate panel adjacent the outer marginal side of each mirror, said mirrors being disposed at such an angle to each other that a person may face one mirror and obscure distracting reflected rays adjacent the marginal side of the other mirror when viewing his back in the latter mirror.

3. In a structure of the class described, an arcuate panel having a light reflecting surface on its concave side, a pair of mirrors within the confines of said panel fixedly spaced from and at an angle to each other whose inner marginal sides abut the concave surface of said panel and whose outer marginal sides are spaced therefrom, concealed illuminating means for each mirror whose rays are reflected toward each other from opposite sides of the arcuate panel adjacent the outer marginal side of each mirror, said mirrors being disposed at such an angle to each other that a person may face one mirror and obscure distracting reflected rays adjacent the marginal side of the other mirror when viewing his back in the latter mirror.

4. In a structure of the class described, an arcuate panel having a light reflecting surface on its concave side, a pair of mirrors within the confines of said panel fixedly spaced from and at an angle to each other whose inner marginal sides abut the concave surface of said panel and whose outer marginal sides are spaced therefrom, illuminating means disposed between the rear side of each mirror and the concave surface of said panel whose rays are reflected toward each other from opposite sides of the arcuate panel adjacent the outer marginal side of each mirror, said mirrors being disposed at such an angle to each other that a person may face one mirror and obscure distracting reflected rays adjacent the marginal side of the other mirror when viewing his back in the latter mirror.

5. In a structure of the class described, a pair of mirrors fixedly spaced and at an angle to each other, concealed electrically wired spaced lamp sockets for each mirror, incandescent lamps for said sockets for adjustably directing, graduating and diffusing light rays adjacent the outer marginal side of each mirror, said mirrors being disposed at such an angle to each other that a person may face one mirror and obscure distracting reflected rays adjacent the marginal side of the other mirror when viewing his back in the latter mirror.

6. In a structure of the class described, an arcuate panel having a light reflecting surface on its concave side, a pair of mirrors within the confines of said panel fixedly spaced from and at an angle to each other, concealed electrically wired spaced lamp sockets for each mirror, incandescent lamps for said sockets for adjustably directing, graduating and diffusing light rays adjacent the outer marginal side of each mirror, said mirrors being disposed at such an angle to each other that a person may face one mirror and obscure distracting reflected rays adjacent the marginal side of the other mirror when viewing his back in the latter mirror.

7. In a structure of the class described, an arcuate panel having a light reflecting surface on its concave side, a pair of mirrors within the confines of said panel fixedly spaced from and at an angle to each other whose inner marginal sides abut the concave surface of said panel and whose outer marginal sides are spaced therefrom, concealed electrically wired spaced lamp sockets for each mirror, incandescent lamps for said sockets for adjustably directing, graduating and diffusing light rays adjacent the outer marginal side of each mirror, said mirrors being disposed at such an angle to each other that a person may face one mirror and obscure distracting reflected rays adjacent the marginal side of the other mirror when viewing his back in the latter mirror.

8. In a structure of the class described, a pair of mutually reflecting mirrors adjacent the opposite vertical sides respectively of the structure and mutually inclined in a horizontal plane, a pair of reflectors spaced outwardly behind the mirrors respectively, having reflecting inner surfaces concave in a horizontal plane and front edges extending forwardly beyond the front edges of the adjacent mirrors respectively, light-emitting means between the mirrors and the adjacent reflectors respectively, the mirrors and reflectors being so relatively disposed that the light emitted by said means and reflected from its adjacent reflector is shielded by the adjacent mirror from shining directly on the other mirror, the occupant of the structure positioned between the mirrors and viewing himself in both of them being thus shielded from the glare of light reflected from either mirror.

9. In a structure of the class described, a pair of mirrors spaced from and at an angle to each other, concealed illuminating means for each mirror, each reflecting its rays adjacent the outer marginal side of its mirror, said mirrors being disposed at such an angle to each other that a person may face one mirror and obscure distracting reflected rays adjacent the marginal side of the other mirror when viewing his back in the latter mirror.

10. In a structure of the class described, a pair of mirrors spaced and at an angle to each other, concealed electrically wired spaced lamp sockets for each mirror, incandescent lamps for said sockets for adjustably directing, graduating and diffusing light rays adjacent the outer marginal side of each mirror, said mirrors being disposed at such an angle to each other that a person may face one mirror and obscure distracting reflected rays adjacent the marginal side of the other mirror when viewing his back in the latter mirror.

KENNETH C. WELCH.